Dec. 12, 1950 T. B. McCORMICK 2,533,950
INDIVIDUAL MOUNTING FOR STEERABLE WHEELS
Filed Jan. 17, 1947 2 Sheets-Sheet 1

Inventor
THOMAS B. McCORMICK

By Randolph & Beavers
Attorneys

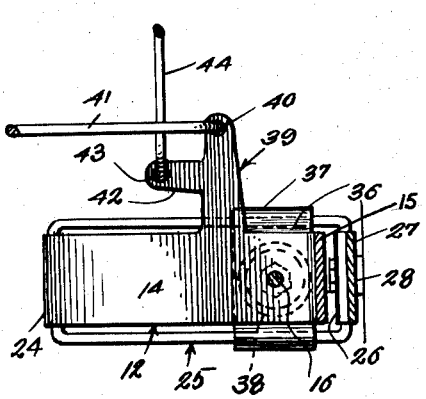
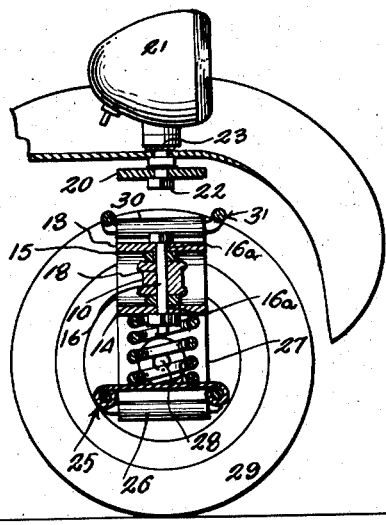
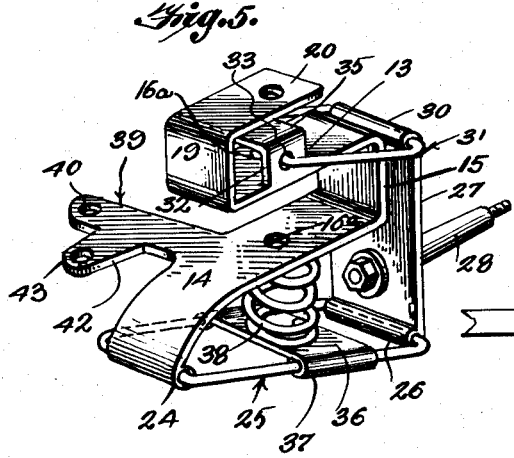
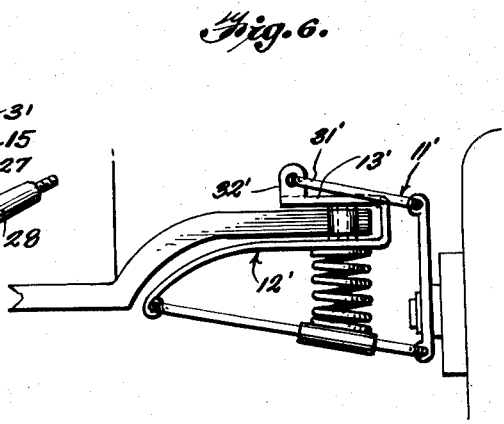

Patented Dec. 12, 1950

2,533,950

UNITED STATES PATENT OFFICE 2,533,950

INDIVIDUAL MOUNTING FOR STEERABLE WHEELS

Thomas B. McCormick, Billings, Mont.

Application January 17, 1947, Serial No. 722,670

1 Claim. (Cl. 280—96.2)

This invention relates to an improved mounting for the ground engaging steering wheels of a motor vehicle and has a special reference to a mounting of extremely simple construction by means of which the individual front or steering wheels of a vehicle may yield, each independently of the other, relatively to the vehicle chassis in passing over uneven surfaces.

More particularly, it is an object of the invention to provide a wheel mounting of extremely simple construction which may be applied to conventional chassis or frames for yieldably supporting the front steering wheels relatively thereto and so that said wheels may be turned as a unit in response to movement of a draglink connection and for providing a means for permitting the wheels to yield independently relatively to the frame and to be maintained substantially in a perpendicular plane during their yielding movement to thereby avoid excessive wear on the tread portions of the tires of the wheels.

Still a further object of the invention is to provide an individual yielding knee action wheel mounting having a tie rod connection, forming a part thereof and constructed and arranged to maintain itself at all times in substantially the same plane relatively to the vehicle chassis or frame whereby when a pair of said mountings are connected by a tie rod, the wheels supported thereby will be maintained in alignment.

Various other objects and advantages of the invention will hereinafter become more fully apparent from the following description of the drawings, illustrating a preferred embodiment thereof, and wherein:

Figure 1 is a front elevational view, partly in section showing the forward portion of one side of the motor vehicle and with one of the resilient mountings applied thereto for supporting one of the steering wheels of the vehicle, yieldably with respect to the vehicle chassis or frame;

Figures 2 and 3 are horizontal sectional views taken substantially along planes as indicated by the lines 2—2 and 3—3, respectively, of Figure 1;

Figure 4 is a longitudinal vertical sectional view taken substantially along a plane as indicated by the line 4—4 of Figure 1;

Figure 5 is a perspective view showing the wheel mounting detached, and

Figure 6 is a view similar to Figure 1 of a slightly modified form of the invention.

Figure 1:
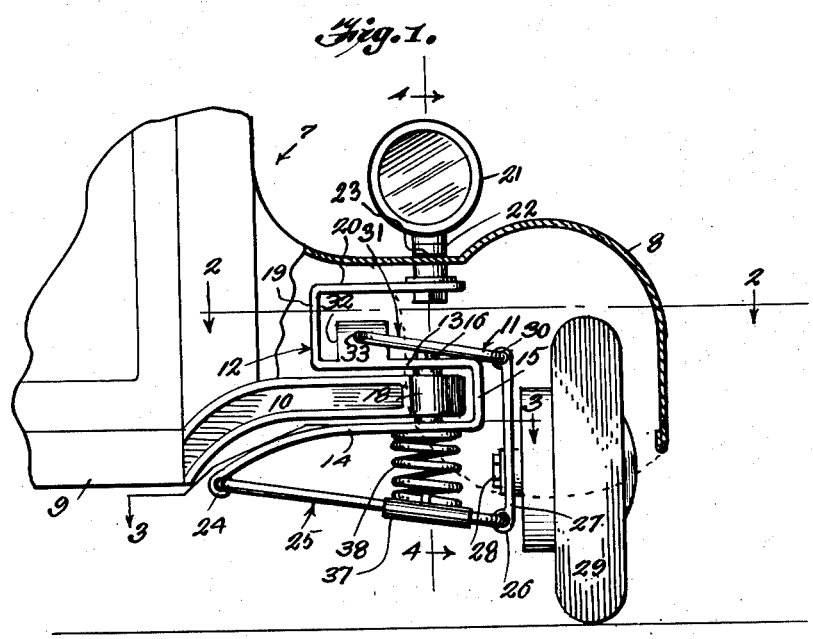

Referring more specifically to the drawings, with particular reference to the form of the invention as illustrated in Figures 1 to 5, 7 designates generally the front portion of a motor vehicle including a part of the left front fender 8 and a portion of the chassis or frame 9 of the vehicle, including one end 10 of the transverse front cross part thereof and which is curved upwardly relatively to the frame or chassis 9, adjacent its inner end.

The resilient mounting, designated generally 11 and comprising the invention includes a frame, designated generally 12 having an intermediate portion including vertically spaced, substantially parallel top and bottom bar portions 13 and 14, respectively, between which the outer, free end portion of the frame arm 10 is disposed. The portions 13 and 14 are integrally joined by the perpendicular frame portion 15 which extends between corresponding ends thereof and which is disposed outwardly of the free ends of the frame arm 10. Portions 13 and 14 of the frame 12 are provided with aligned openings 16a adapted to receive a king bolt 16 which extends through a bearing portion 18 of the arm 10, as best seen in Figure 4.

The opposite, inner end of the upper bar portion 13 terminates in an upturned frame part 19 forming a connection between the frame portion 13 and an upper frame portion 20, which is disposed substantially parallel thereto and which constitutes one end of the frame 12. A headlight 21 is disposed above the fender 8 and has a depending standard 22 extending therethrough and secured to the frame arm 20, substantially in vertical alignment with the king bolt 16. The standard 22 is preferably provided with anti-friction means 23 at its connection with the fender 8.

The lower frame bar 14 extends inwardly substantially beyond the inner end of the upper bar 13 and is curved downwardly to substantially conform to the curvature of the frame arm 10. The inner lower end of the lower bar 14, which forms the opposite end of said frame 12, terminates in an eye 24, disposed transversely of said arm and forming a pivot for the inner end of a lever 25 which, as best seen in Figures 3 and 5, constitutes an elongated substantially rectangular frame, preferably of circular cross section, having one of the shorter sides thereof journaled in the eye 24 and the other, complementary side thereof journaled in an eye 26 formed in the lower end of a plate 27. The plate 27 forms a wheel bracket and has a stub axle secured thereto and projecting outwardly therefrom, as seen at 28, on which a front ground engaging wheel 29 of the vehicle is journaled. The plate or bracket 27 is provided with an eye 30 at its upper end corresponding to the eye 26 for journaling an end of a lever 31, of the same construction as the lever 25 and differing therefrom only in that the lever 31 is of a length less than that of the lever 25.

The frame portion 13 is provided with upstanding ears 32 at its side edges and which are disposed inwardly of the king pin 16 and which are provided with aligned apertures 33 for journaling the opposite end of the lever 31. Said ears 32 may be connected at their upper ends by a cross member 35 and obviously the ends of the lever 31 journaled in the ears 32 may, if desired, be connected and function as an actuator for any conventional type of shock absorber.

A plate 36 extends between the longer sides of the lever 25 and has rolled end portions 37 secured thereto. The plate 36 forms a perch for one end of an expansion coil spring 38, the opposite end of which seats against the under side of the frame portion 14 and, as seen in Figures 1 and 2, the spring 38 is disposed in substantially axial alignment with the king bolt 16 and functions to urge the levers 25 and 31 and the wheel bracket 27 downwardly to provide a yieldable support between the wheel 29 and the chassis arm 10.

Figure 2:
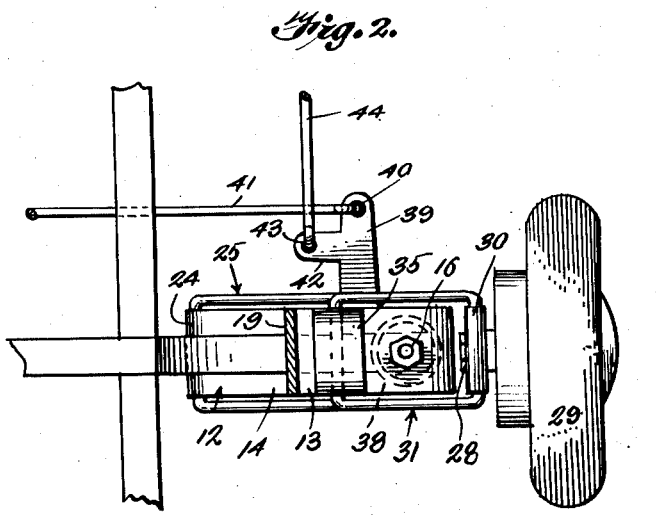

As best seen in Figures 2, 3, and 5, the frame portion 14 is provided with an integral lever arm 39 which projects transversely from one side edge thereof in a direction rearwardly with respect to the chassis 9 and which is disposed inwardly of the king pin 16. The arm 39 is provided with an eye 40 adjacent its rear, free end which is adapted to be connected pivotally to one end of a tie rod 41 which extends transversely therefrom and which is adapted to be connected in a similar manner to a similarly yieldable mounting 11, not shown, of the other front steering wheel of the vehicle. The lever arm 39 is also provided with a laterally projecting extension 42, intermediate of the ends thereof, and which extends inwardly therefrom relatively to the chassis 9. The extension 42 is provided with an eye or opening 43 adjacent its free end to pivotally engage the forward end of a draglink 44 which may be connected at its opposite rear end to any conventional type of steering mechanism.

From the foregoing, it will be readily apparent that a rearward movement of the draglink 44 will turn the frame 12 in a clockwise direction as seen in Figures 2 and 3 for turning the wheel 29 in the same direction, and the other front wheel of the vehicle, not shown, will be turned in a conventional manner through the tie rod connection 41 in the same direction and to the same extent. Conversely, a forward movement of the draglink 44 will cause the frame 12 and wheel 29 to be turned in a counterclockwise direction on the king bolt 16. The spring 38 will function to permit the wheel 29 to yield upwardly relatively to the chassis 9 and independently of the other wheels of the vehicle in passing over an uneven surface such as a hump in a roadway and the levers 25 and 31 will maintain the wheel bracket 27 in substantially a vertical position during the pivotal movement of said levers so as to maintain the wheel 29 in substantially an upright position to prevent excessive wear on the tread of the pneumatic tire thereof.

The connection of the head light standard 22 to the frame arm 20 will cause the head light 21 to function as a dirigible head light for turning in unison with the frame 12 and the wheels 29 and in the same direction so that the head lights 21 will be disposed to face in the direction that the vehicle is moving.

Since all of the yielding movements of the resilient mounting 11 is accomplished by the levers 25 and 31 swinging relatively to the frame 12 and carrying the wheel bracket 27 and wheel 29 therewith, the lever arm 39 will maintain its relative position and spacing with respect to the complementary arm, not shown, of the other front wheel mounting so that the front wheels of the vehicle will be maintained at all times in alignment and since the frame 12 is not subject to any yielding movement with respect to the chassis 9 or chassis arm 10, due to the location of the spring 38 with respect to the king bolt 16, so that there will be no relative movement of the head light or its standard toward or away from the chassis arm 10.

Obviously, the head light 21 could be mounted within the fender 8 with the lens portion thereof disposed for swinging movement relatively to a forwardly facing opening of the standard.

Figure 6 illustrates a slightly modified form of the mounting, designated generally 11' and differing only from the mounting 11 in that the frame 12' thereof is not connected to a head light and accordingly the portions 19 and 20 are omitted and the portion 13' terminates in upstanding ears 32', similarly disposed to the ears 32 and in which the inner end of the lever 31' is journaled. As the operation of the mounting 11' is otherwise identical to the mounting 11, a further description thereof is considered unnecessary.

Various other modifications and changes are likewise contemplated and may obviously be resorted to, without departing from the spirit and scope of the invention as hereinafter defined by the appended claim.

I claim as my invention:

A front steering wheel and headlight mounting for motor vehicles comprising, in combination with a front steering wheel, a front axle end and a headlight; a mounting comprising a unitary frame having spaced portions disposed above and beneath the front axle end, a kingbolt extending through the axle end and said spaced portions and swivelly connecting the frame to the axle end, a wheel bracket plate, a stub axle secured to and projecting outwardly from the wheel bracket plate on which said front steering wheel is journaled, means pivotally connected to spaced parts of the wheel bracket plate and to said spaced frame portions above and below the axle end and extending across the axis of the kingbolt and yieldably supporting the wheel bracket plate on the frame for movement in substantially a vertical plane relatively to the frame and front axle end, said frame including an integral headlight supporting portion disposed above said spaced frame portions to which the headlight is secured and on which the headlight is mounted to swivel about an axis substantially in alignment with the axis of the kingbolt whereby the headlight will swing in unison with said front steering wheel.

THOMAS B. McCORMICK.

REFERENCES CITED

The following references are of record in the file of this patent:

UNITED STATES PATENTS

| Number | Name | Date |
|---|---|---|
| 967,621 | Donahoo | Aug. 16, 1910 |
| 1,344,192 | Vandenburgh et al. | June 22, 1920 |
| 1,649,661 | Burnfiel | Nov. 15, 1927 |
| 2,066,552 | Best | Jan. 5, 1937 |
| 2,066,553 | Best | Jan. 5, 1937 |
| 2,305,820 | Wagner | Dec. 22, 1942 |
| 2,357,370 | Wilfert | Sept. 5, 1944 |